June 11, 1968 A. D. CORMACK ET AL 3,387,796
DEFIBRATING DEVICE
Filed Feb. 4, 1965 9 Sheets-Sheet 5

INVENTORS
Martin O. Saltarelli
Alexander D. Cormack
J. Blair Scott
Cho-Yee Yeung
BY
Hill, Sherman, Meroni, Gross & Simpson
ATTYS.

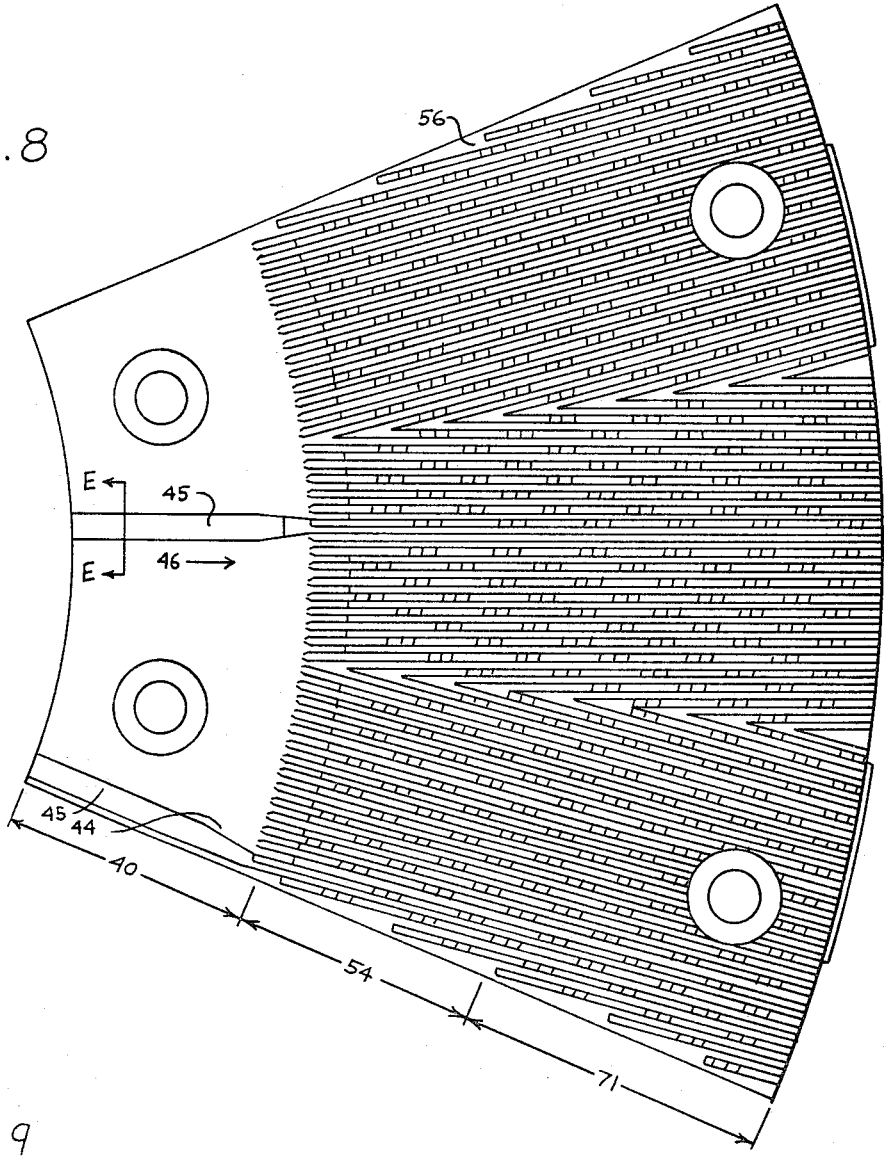
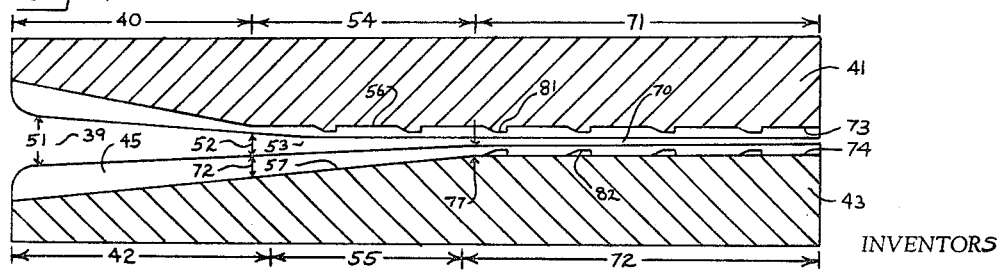

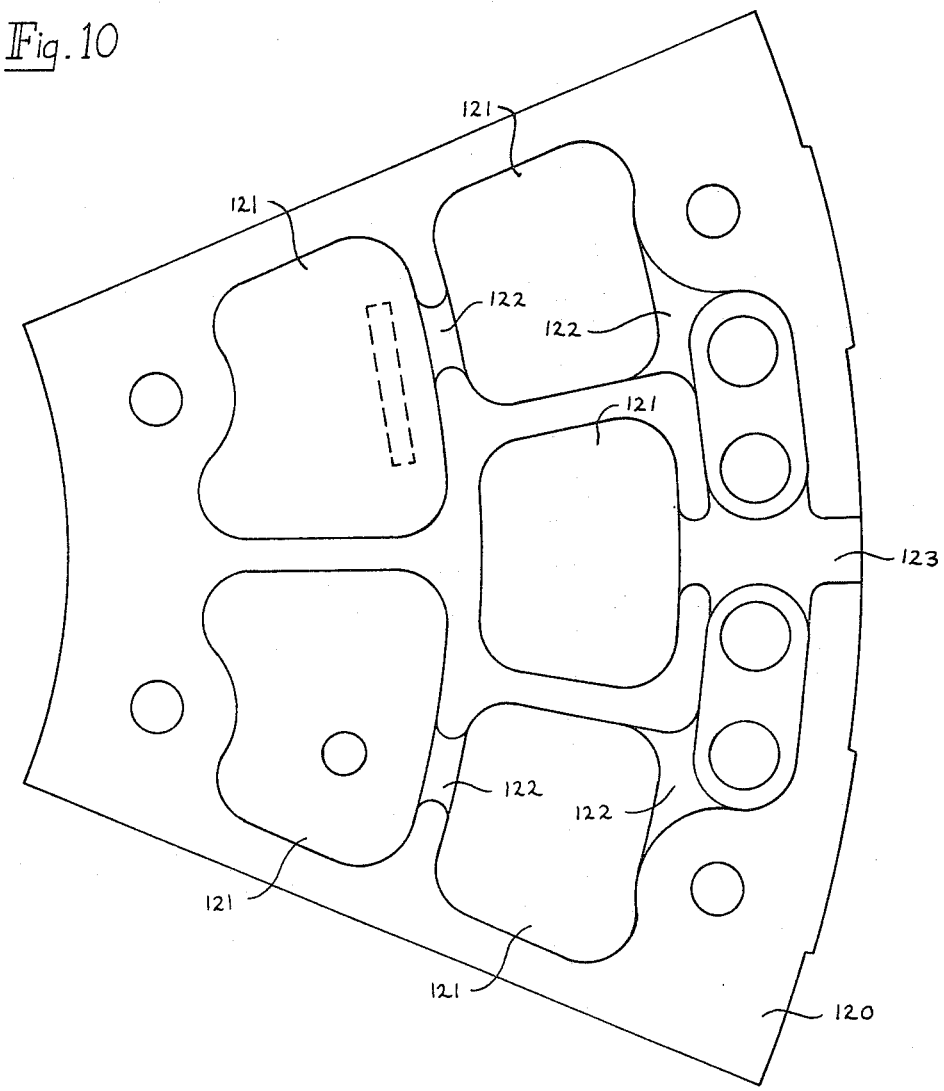

June 11, 1968   A. D. CORMACK ETAL   3,387,796
DEFIBRATING DEVICE

Filed Feb. 4, 1965                                    9 Sheets-Sheet 8

INVENTORS
Martin O. Saltarelli
BY Alexander D. Cormack
J. Blair Scott
Cho-Yee Yeung Hill, Sherman, Meroni, Gross & Simpson
ATTYS.

United States Patent Office 3,387,796
Patented June 11, 1968

3,387,796
DEFIBRATING DEVICE
Alexander D. Cormack and Martin O. Saltarelli, Pittsfield, James Blair Scott, Lenox, and Cho Yee Yeung, Lanesboro, Mass., assignors to Jones Division, Beloit Corporation, Pittsfield, Mass., a corporation of Wisconsin
Filed Feb. 4, 1965, Ser. No. 430,437
6 Claims. (Cl. 241—43)

ABSTRACT OF THE DISCLOSURE

A mechanical pulping and defibrating device comprising a generally cylindrical housing having means associated therewith for introducing a defibrating fluid. Also mounted within the housing is a pair of horizontally arranged upper and lower defibrating discs spaced from one another in such a manner as to define a prebreaking zone, an intermediate defibrating zone and a final material defibrating and refining zone. The inlet of the defibrating apparatus is vented to atmosphere to allow steam pressure, which may be generated between the defibrating discs, to escape through the inlet thereby allowing the stock delivered to the inlet to flow freely therethrough to the defibrating discs. The rotatable defibrating disc is connected directly to the output shaft of a motor which is mounted within the main body of the defibrating apparatus. The motor stater is fixed in position while the motor rotor, as well as the shaft and the rotatable disc, is actually shiftable to adjust the position of the rotatable defibrating disc relative to the stationary defibrating disc.

---

This invention relates to a mechanical pulping and defibrating device and more particularly the invention relates to a pulping device for the pulping of fibrous slurries in which defibration of unseparated fiber bundles is accomplished by passing the fibrous material between close running atrited defibrating surfaces.

The treatment of bulk and unseparated fibrous materials is carried out widely in the industry and such treatment includes the mechanical grinding of large chunks of fibrous material by forcing green, seasoned or pretreated logs or billets against a revolving pulp stone having an appropriately grooved or dressed abrading surface. Individual fibers or small fiber bundles are torn from the log to form a ground wood pulp which after screening and mixing with minor amounts of chemical pulp and other desired additives is accumulated in a stock chest from which it may be further processed to ultimately form a paper web. It will be appreciated that the ground wood pulp thus produced is high in non-fibrous fines and contains a relatively large amount of coarse fiber bundles. Paper webs produced with significant proportions of such pulp is comparatively rough surfaced and weak.

Another well known method of mechanically defibrating fibrous material is known in the art as the low consistency refining process. Such a process, by way of example, is shown and described in U.S. Patent 2,743,874 issued to A.J. Asplund. In practicing this process a quantity of wood chips is mixed with large amounts of water or other carrying agent to obtain a low consistency slurry which is then introduced between closely spaced rotating discs. The opposing surfaces of the discs have abrasive surfaces and the material is fed into the narrow space defined by said discs by means of a screw conveyor or other pressure type feeding device.

The above described defibrating device is well known in the art and has certain operating disadvantages and limitations which are inherent in its construction and field experience has shown that these limitations cannot be resolved by alternately varying process variables without severely affecting the quality of the pulp thus produced.

In a defibrating device of the type using a pressure type feeder to force the fibrous material towards the defibrating area the generation of high feeding pressures, inherent in the type of feeder used, blocks the entrance way to the refining area and entraps steam which is generated due to the sudden rise in temperature at the point of contact of the fibrous material with the first stage of the defibrating zone. This sudden rise in temperature and the resulting formation of steam creates high back pressures in pressure feeding devices due to their inherent inability to permit the steam to escape to the atmosphere through the incoming flow of chips. An attempted solution to this problem has been the addition of water or other carrying agent to the fiber suspension in an effort to reduce the sudden temperature rise and thereby minimize the generation of steam. However, if the temperature rise of the material is not quickly attained the fiber bonding agent is not sufficiently plasticized which results in severe mechanical fiber damage to the relatively inflexible fiber bundles. The fiber bundles are then broken or fractured into short undefibered bundles generally referred to in the art as "chop." Furthermore, the ability of the rotating discs to retain the suspended fiber bundles and efficiently defibrate them is substantially reduced due to the increased fluidity of the suspension thus resulting in inadequate working and defibrating of the fiber bundles. In order to resolve this problem it has been proposed and attempted to decrease the gap between the opposed rotating discs but such a decrease in disc spacing materially increases the mechanical working of the fibers by the abrasive disc surfaces and results in an excessive amount of mechanical damage to the fibers which in turn adversely affects the quality of the final product.

The various attempted solutions enumerated above have not completely resolved the problem and have failed to provide a mechanical defibrator which is efficient in operation and which at the same time is capable of producing a high quality stock.

We have discovered that all of the above enumerated disadvantages can be eliminated by allowing the material to be freely fed to the pulping zone at a high consistency which results in the following improvements and advantages:

(a) rapid and efficient temperature rise of the fibrous material due to the absence of excessive water or other carrying media;
(b) less horsepower expenditure per unit of fibrous material in order to attain the desired plasticizing temperature;
(c) substantially less steam formed per unit of fibrous material treated due to the smaller amount of water present per unit;
(d) by freely feeding the material to the defibrating device the steam formed can readily and freely escape without interfering with the feeding or distribution of the material and regardless of the inlet consistency.

Most importantly, however, the elimination of steam entrapment results in improved feeding and permits high consistency operation which in turn results in larger permissive spacings between the rotating discs with its attendant decrease in mechanical damage to the fibrous material being processed.

In addition to the above we have discovered that the efficiency of prior art mechanical defibrating devices can be further increased by providing for adequate and improved means for distributing the fibrous material throughout the defibrating zone immediately upon its entrance into said zone.

We have further discovered that such defibrating devices can yet be further improved by providing means for breaking the larger pieces of fiber bundles to a size approximating the average bundle size of the mass before proceeding with defibrating.

Further features of our invention lie in the provision of initial heating and difibrataing zones followed by a final defibrating zone to control, limit and maintain the initial rise in temperature of the material.

Theoretical studies have shown that the mechanical defibration of wood is caused by repeated viscoelastic deformation of the wood alternated with the release of pressure. The optimum process appears to be multiple stages of defibrating in which the latter stage is more in the nature of a refining step to produce the desired degree of fineness.

Prior art methods have attempted to obtain this multi-stage process by using a screw or pressure fed difibrator of the type described in the above referred to U.S. Patent 2,743,874 followed by a refiner such as described in U.S. Patent 2,947,485 issued to M. D. Woodruff et al. In such a two stage process the optimum conditions appear to be attained when the power is approximately equally divided between the two units. The consistency of the slurry is held at the highest practical level in both stages and in the first stage this generally varies from 18% to 20% while the consistency in the second stage is held under 18%. With the above referred to prior art devices it has been attempted to accomplish the entire process in one stage, but maximum operating consistency is limited by consistency limitations causing the amount of flow through a single unit to be at a minimum, and the heat generated has less water and stock to carry it away. Prior art feeding mechanisms thus seriously limit the feeding consistency and ability to vent steam. At permissive levels of consistency in such prior art devices so much steam is generated that considerable pressure is developed and the flow to the refiner is seriously impeded. In thus attempting single stage operation it has been found necessary to operate at lower consistencies at the expense of quality and power. By our improved method and apparatus for feeding the material to the defibrating area at high consistencies we eliminate the creation of back pressure due to the formation of steam and obtain other advantages which will be described in detail below.

Accordingly, it is an important object of the invention to provide a mechanical pulping and defibrating device in which the fibrous material is permitted to freely enter the defibrating zone.

Another object of the invention is to provide a defibrating device of the type described in which the steam formed in the initial portion of the defibrating zone is allowed to readily and effectively escape to the atmosphere thus preventing the creation of back pressures with its attendant disadvantages.

Yet another object of the invention is to provide a defibrating device which includes a material distributing means for the effective and even distribution of material throughout the defibrating zone.

A still further object of the invention is to provide a mechanical pulping device which includes a material prebreaking zone for the effective reduction of larger bundles of material to a size approximating the average bundle size of the mass.

Another object of the invention is to provide a pulping device in which the material is subjected to a first relatively coarse defibrating or pulping zone followed by successive finer defibrating or refining zones.

Another object of the present invention is to provide a mechanical pulping and defibrating device which includes blade means mounted on the outer periphery of the rotating disc for forcing processed material towards the exit portion of the defibrating device.

Another object of the invention is the provision of a mechanical pulping and defibrating device in which the defibrating surfaces are arranged in a generally horizontal plane and in which a vertical longitudinally extending shaft is utilized for rotationally driving one of said surfaces.

A feature of the invention is the provision of a mechanical pulping and defibrating device comprising in combination, a generally cylindrical housing having means associated therewith for introducing a defibrating fluid, said housing containing a generally horizontally arranged upper defibrating disc and a generally horizontally arranged lower defibrating disc spaced from said upper disc, means defining a material pre-breaking zone defined by a downwardly facing inner annular portion of said upper disc and an upwardly facing inner annular portion of said lower disc, and intermediate defibrating zone defined by intermediate annular portions of said upper and lower discs, a final material defibrating and refining zone defined by the outer annular portions of said upper and lower discs, a vertical longitudinally extending shaft fixedly connected to said lower disc, and means for rotationally driving said shaft.

These and other objects of the invention will appear from time to time as the following specification proceeds and with reference to the accompanying drawings wherein:

FIGURE 8 is a plan view of an upper defibrating disk showing certain improvements in accordance with the present invention;

FIGURE 9 is a partial sectional view taken substantially along the lines D—D of FIGURE 2 and showing the upper and lower defibrating surfaces in their approximate operative relationship;

FIGURE 10 is a plan view of a section of the upper and lower defibrating discs showing an improved design of the material saving and balancing cavities usually provided therein;

Figure 1:
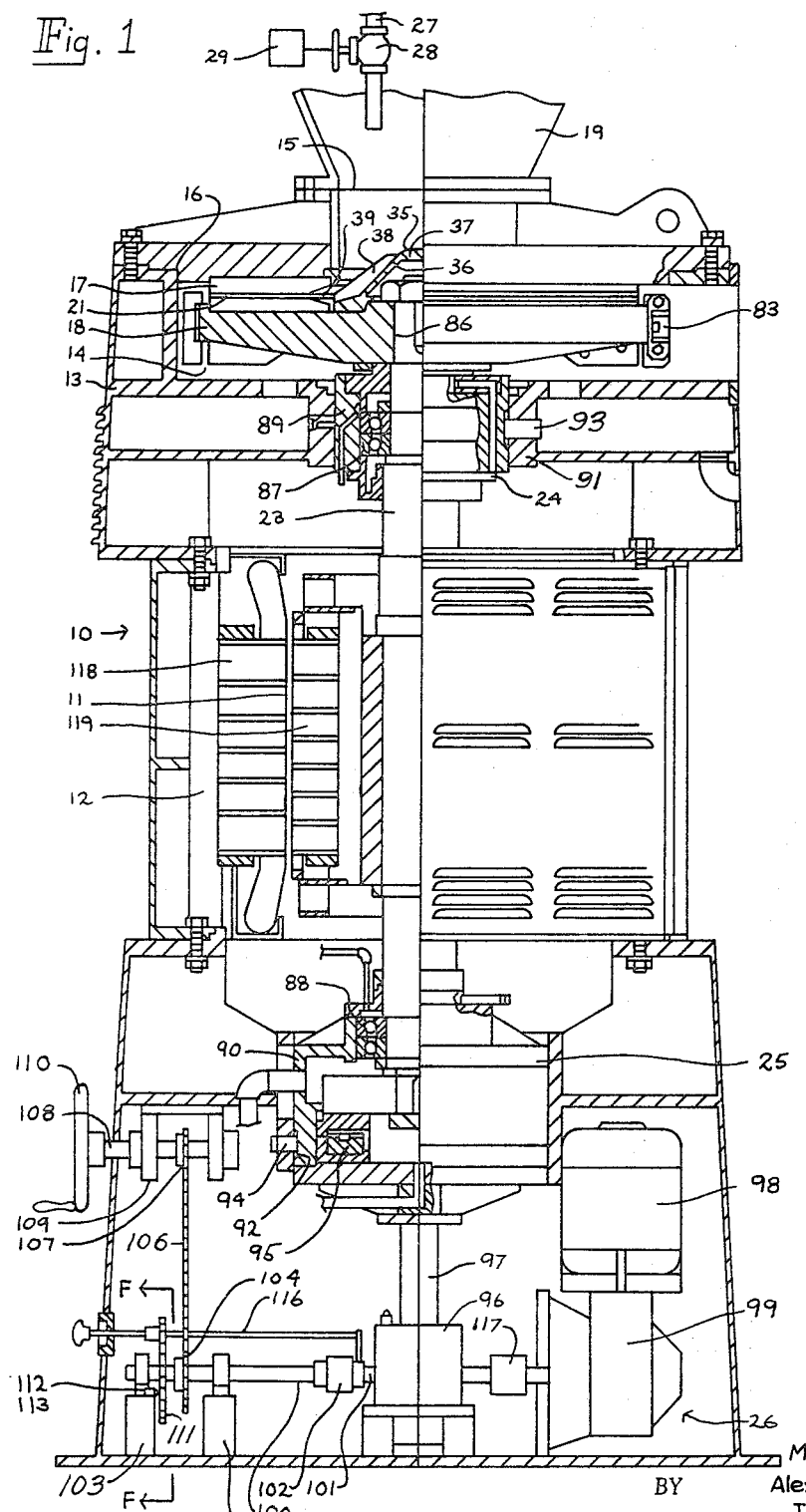
FIGURE 1 is a vertical sectional view taken through an improved mechanical defibrating device embodying the principles of the present invention.

In the embodiment of the invention illustrated in the drawings, FIGURE 1 shows a mechanical defibrator or pulper 10 having a drive motor 11 within a housing 12 which, in turn, has an upper housing 13 mounted thereon with a pulping chamber 14 therein. The pulping chamber 14 has a relatively large upwardly facing opening 15 for the introduction of fibrous material. The opening 15 is formed in an upper pulping chamber cover 16. Within the pulping chamber and supported from the cover 16 is an upper defibrating disc or stator 17. Also within the chamber 14 is a lower defibrating disc or rotor 18. The stator 17 and rotor 18 have downwardly and upwardly facing defibrating faces respectively which are provided with defibrating bars or blades as will be explained in detail hereinbelow.

Figure 2:
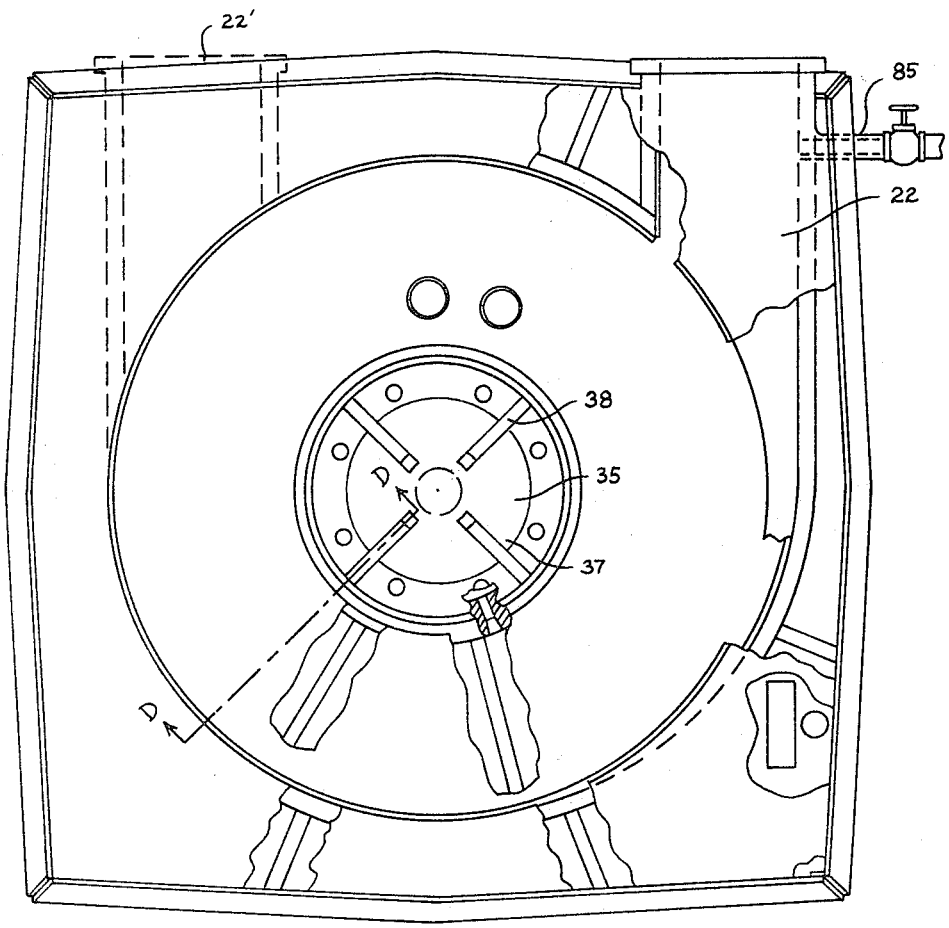
FIGURE 2 is a fragmentary vertical sectional view of the upper portion of the defibrating device.

The fibrous material is introduced into the pulping chamber 14 through the inlet opening 15 via a trough like member 19. The fibrous material then flows radially outwardly to the defibrating space 21 into the chamber 14 and then generally tangentially to one or more outlets 22 and 22' as shown in FIGURE 2.

The rotor 18 is supported by a shaft 23 which is shown as the shaft of the drive motor 11.

The motor is enclosed within the housing 12 which also serves to support the pulping unit. The rotor 18 is supported freely for vertical movement with upper and lower bearing assemblies 24 and 25 respectively.

For applying an upward force for axially shifting the rotor shaft 23 we have herein provided an adjustment mechanism 26 which will be discussed in detail below.

Figure 3:
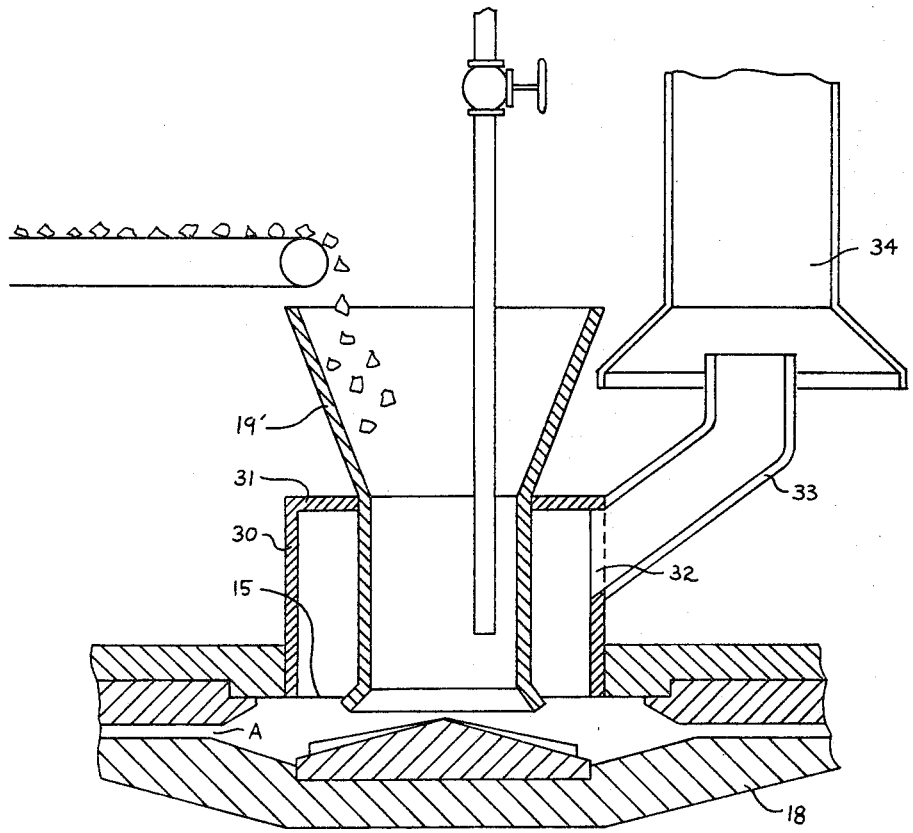
FIGURE 3 is a partial vertical sectional view taken through the upper portion of the defibrating device and illustrating a modified design.

The inlet or feed portion of the pulping or defibrating device, as shown in FIGURES 1, 2, and 3, consists of a trough like member 19 which is bolted or otherwise secured to the upper pulping chamber cover 16 and the feeding trough is in open communication with the pulping chamber 14. A supply line 27 extends partially into the trough 19 and a dilution agent or other chemical substance may be added to the fibrous material through the supply line 27 to further the effective defibration of the material. A control valve 28 in the line 27 enables the operator to regulate quantity of the dilution agent and thereby the consistency of the fibrous material as it is introduced into the defibrating space 21. The control valve may be actuated either manually or by means of an automatic control device 29 which may regulate the valve 28 in response to a signal received from a final product quality sensing device or a horsepower measuring device connected to the drive motor 11. The upper portion of the feeding trough is in open communication with the atmosphere and thus permits the free escape of steam formed during the initial stages of the defibrating process. The open trough further permits the free entry of air into the defibrating zone which enhances the defibrating process and aids in maintaining and controlling the initial rise in temperature during the preliminary stages of the defibrating process.

As pointed out above the free escape of steam has certain advantages not heretofore appreciated in the art and in order to further improve the escape of steam without interfering with the feeding of raw material to the pulping device, we have herein provided an alternate feeding structure as shown in detail in FIGURE 3. As shown therein, an annular chamber 30 is mounted directly over the inlet opening 15 and the upper portion of the chamber 30 is closed off by an annular ring 31. A trough like member 19' is mounted on the chamber 30 and extends into the chamber and the outlet portion thereof comes into close proximity with the rotor 18. The outlet portion of the member 19' may be flared outwardly to facilitate the discharge of fibrous material. Steam which is formed in the initial defibrating zone such as for example at A is thus permitted to freely accumulate in the chamber 30. The chamber 30 is provided with an opening 32 at one end thereof and an exhaust duct 33 carries the steam away from the chamber 30 into an exhaust hood 34. With this construction very little steam will escape through the feeding trough 19' and the opening of the trough is thus unobstructed and free for the supply of raw material to the pulping device in a generally downward direction. This construction eliminates upward flow or drafts through the trough 19' and further enhances the entrance of material into the defibrating zone.

The feeding trough 19 feeds the raw material to a distributing zone 35 in which the raw material is evenly and radially distributed. The distributing zone consists of a generally conical shaped member 36 having a flat upper portion 37 and being fixedly attached to the rotor 18. The member 36 has a plurality of radially extending distributing vanes 38 attached thereto. The vanes 38 extend generally downwardly along the conical portion of the member 36 and direct the material towards the entrance portion of the defibrating zone 21 by centrifugal force. The centrally located distributing member 36 evenly distributes the raw material and thus supplies a uniform amount of material to each circumferential section of the entrance portion of the defibrating space 21. It is important that the distribution be as even as possible since with uneven circumferential distribution the fibrous material will be non uniformly treated.

Figure 12:
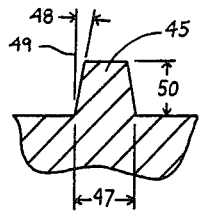
FIGURE 12 is a cross-sectional view taken substantially along the lines E—E of FIGURE 8.

As the material is circumferentially distributed by the distributing means 35 the material enters into a pre-breaking zone 39 defined by a downwardly facing inner annular portion of the stator 17 and an upwardly facing inner annular portion of the rotor 18. The material prebreaking zone is shown in detail in FIGURE 9 and is defined by an inner annular downwardly facing portion 40 of the upper defibrating disc 41 and a lower upwardly facing inner annular portion 42 of the lower defibrating disc 43. As shown in FIGURE 8 the inner annular portion 40 of the upper defibrating disc 41 consists of a downwardly and inwardly tapered flat surfaced inner annular ring 44 to which are secured a plurality of radially extending angularly spaced breaker bars 45 as shown in FIGURE 12. The breaker bars 45 are generally trapezoidal in cross-sectional area which gradually decreases in a radially outward direction 46. Preferably the base dimension 47 of the trapezoid is from .250 inch to .500 inch and the angle 48 defined between the sides of the trapezoid and the vertical line 49 may vary from 8° to 12° and is preferably in the neighborhood of 10°. The height 50 of the trapezoid may vary from approximately .250 inch to .500 inch and is preferably .350 inch at the innermost extremity thereof and then gradually decreases to a height from between 0 inch to .500 inch and is preferably .200 inch. The preferred number of breaker bars on each disc may vary from 4 to 32 but lies preferably in the neighborhood of 16. A small number of breaker bars will result in insufficient prebreaking of the larger chunks of raw material while too large a number of breaker bars will cause an unnecessary rise in temperature of the raw material at too fast a rate. If too much work is done on the fibrous material by the breaker bars before the plasticizing temperature is reached the formation of "chop" increases at a rapid and alarming rate. This "chop," in the form of short chunky shives, is undesirable in papermaking and must be removed from the final products by additional refining which has been found to be difficult and results in an inferior pulp. The breaker bars of the lower disc 43 are substantially similar to the breaker bars of the upper disc as described above with the exception that the rate at which the cross-sectional area decreases is substantially smaller and the height may vary from a maximum dimension of from .250 inch to .500 inch and preferably .350 inch and gradually decreasing to a minimum height of from 0 inch to .500 inch and preferably .200 inch. The breaker bars on the upper plate 44 are stationary while the breaker bars 45 on the lower disc are rotatable with respect to the upper disc and therefore serve the dual function of breaking up the larger fiber bundles and moving these fiber bundles radially outwardly. As further shown in FIGURE 9 the breaker bars of the upper and lower defibrating discs 41 and 43 respectively define a gradually outwardly tapering mouth portion or prebreaking zone 39. The purpose of the taper is to gradually and evenly break the over-sized chunks of material and to cause the same to be gradually thrown outwardly by centrifugal force. The entrance dimension 51 of the prebreaking zone as measured between the bars may vary from 0 inch to 2.00 inch and is preferably in the neighborhood of .500 inch. The spacing 52 between the bars at the exit portion of the prebreaking zone may vary from 0 inch to .500 inch and is preferably in the neighborhood of .200 inch.

Figure 4:
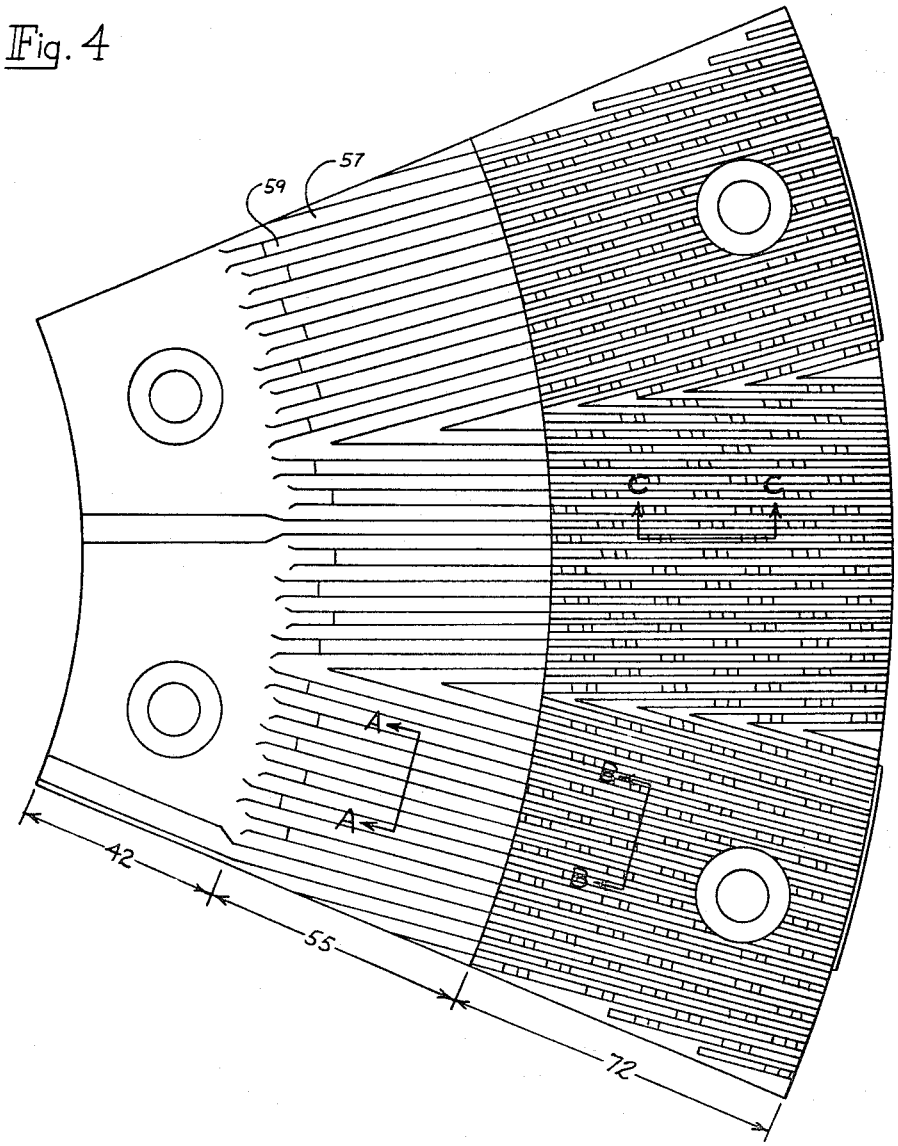
FIGURE 4 is a plan view of a segment of a lower defibrating disc embodying certain principles of the present invention.
Figure 5:
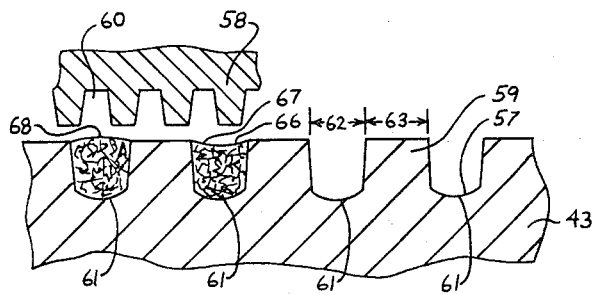
FIGURE 5 is a sectional view taken substantially along the lines A—A of FIGURE 4.
Figure 6:
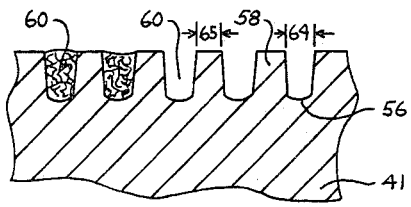
FIGURE 6 is a further sectional view taken substantially along the lines B—B of FIGURE 4.
Figure 7:
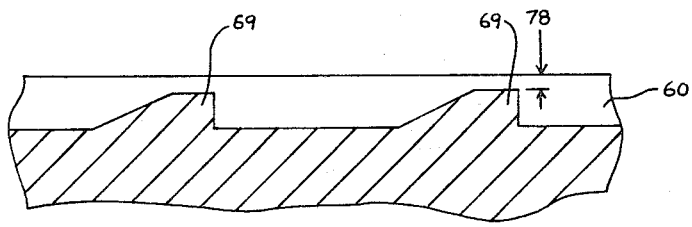
FIGURE 7 is a sectional view taken substantially along the lines C—C of FIGURE 4.

As will be hereinafter described in detail, the lower disc 43 is vertically adjustable with respect to the upper disc and the above dimensions 51 and 52 are representative with the lower disc in the midway position. As the material leaves the pre-breaking zone 39 as a homogenous mass of fiber bundles which contains virtually no large chunks of material, the fiber bundles enter into an intermediate material defibrating zone 53. The zone 53 is defined by an intermediate annular portion 54 of the upper defibrating disc and an intermediate annular portion 55 of the lower defibrating disc. The opposed surfaces 56 and 57 of the upper and lower discs respectively are of a novel and special design so as to provide for adequate temperature control in order to avoid degradation of the cellulose fibers. It has been established that undesirable degradation of cellulose fibers occurs in the presence of mechanical action if the temperature of the fiber mass is allowed to exceed about 180° C. Our novel design of the intermediate defibrating zone further enables us to control the retention time of the fibrous material in the intermediate zone due to the special configuration of the annular chamber defined by the opposing surfaces 56 and 57. It will be noted that the surface 57 gradually tapers away from the surface 56 in a radially inward direction. More specifically, the surface 56 is shown in FIGURES 6 and 8 as having a series of radially extending angularly spaced bars or ridges 58 thereon. The ridges 58 define with the surface 56 a multiplicity of grooves which have been specially designed to accomplish in addition to proper defibration and in cooperation with the lower disc surface, the functions of temperature control and the control of retention time of the fibrous material to be processed. The lower surface 57 is shown in detail in FIGURE 4 and FIGURE 5 and it will be noted that the surface 57 has a multiplicity of bars 59 thereon thus providing a series of grooves and ridges which are of generally coarser configuration than the grooves and ridges on the surface 56 of the upper disc 41. More specifically, the width 62 of the groove 61 is in the neighborhood of approximately $3/16$ inch and the width 63 of the ridge 59 is in the neighborhood of $3/16$ inch as indicated in FIGURE 5 which shows the coarse intermediate zone of the lower disc 43. The intermediate defibrating section of the upper stationary disc 41 is of substantially finer design and more specifically the width 64 of the groove 60 is preferably in the neighborhood of .125 inch while the width 65 of the ridge 58 is preferably in the neighborhood of .095 inch. It will thus be seen that we have provided for an intermediate defibrating zone in which the bars of the upper stationary plate are spaced substantially closer together and are of substantially smaller width than the opposing bars on the lower rotating defibrating disc. In this manner we achieve superior control of both temperature and retention time because the amount of mechanical action on the fibers is substantially reduced while the fiber to fiber action of the fiber bundles is substantially increased. During the initial stages of operation the grooves 60 and 61 of the upper and lower defibrating discs respectively are filled up with fibrous material which remains in the grooves during the operating life of the discs. With the grooves thus filled with fibrous material the opposing disc surfaces become relatively flat thus presenting to each other alternating surfaces of hard metal followed by resilient fibrous material. A bundle of fibers traveling radially and circumferentially through the intermediate zone is thus subjected to mechanical treatment between opposing fibrous surfaces. By increasing the width of the fibrous surfaces and the metal surfaces of the lower defibrating disc to approximately twice the width of the respective surfaces of the upper defibrating disc we have found that fiber to fiber defibrating action is substantially increased while the metal to metal action on the fiber bundles is substantially decreased. This advantageous result is in part due to the fact that the fiber bundles progress or roll faster between two opposed metal surfaces than between two opposed fibrous surfaces. The retention time between the opposed metal surfaces is thus substantially reduced. The friction between the fibrous surfaces is substantially higher than the friction between the metal surfaces and as a consequence the retention time between the latter surfaces is substantially larger. Furthermore, the fibrous surfaces are somewhat resilient and tend to imbed the fiber bundles thereby adding to the retention time. In addition we have found that by providing the rotating disc with a coarser pattern an individual fiber bundle tends to travel with the rotating disc rather than adhere to the stationary disc thus markably increasing the defibrating efficiency of the defibrator. As further indicated in FIGURES 5 and 6 the resiliency of the fibrous material in the grooves 60 and 61 of the discs 41 and 43 respectively will cause the fibrous material in the grooves to pulsate due to the operating fluid pressure between the plates as the metal ridges 58 and 59 pass over the respective grooves. For example, with the ridge 58 over the groove 61 the fibrous material 66 will be depressed thus presenting a somewhat concave fibrous surface 67 to the ridge 58. On the other hand, the concave surface 67 will change to a convex surface 68 when one of the grooves 60 of the upper plate 41 is facing the groove 61 of the lower plate 43. It should further be noted that the intermediate portion of the lower plate 43 has a surface 57 as shown in FIGURE 9 which gradually tapers outwardly thus causing the cross-sectional area of the grooves and ridges 59 and 57 thereof to gradually decrease in cross-sectional area. More specifically, the maximum height 72 of the ridges 59 at the entrance portion of the intermediate zone 55 may vary from approximately 0 inch to .500 inch and is preferably .200 inch. The minimum height 77 at the exit side of the intermediate zone 55 may vary from 0 inch to .500 inch and is preferably .125 inch. Due to this gradual restriction in cross-sectional area of the grooves 61 and ridges 59 of the lower plate 43 the fibrous material will readily accumulate in the grooves during the initial operating period of the defibrating device. The filling of the grooves with fibrous material is further facilitated by the high consistency of the raw material at which this device is designed to operate. As shown in FIGURE 7, the grooves of the upper stationary plate, however, are of substantially uniform cross-sectional area and in order to insure proper filling thereof with fibrous material we have provided a series of dams 69 in the grooves 60 so as to retain the fibrous material therein.

Dams have been used in prior art devices but have generally been only slightly lower in height than the depth of the groove 60. With our device, being capable of handling high consistency slurries the dams may be of substantially less height than the depth of the groove 60 because the material is retained in the grooves 60 in a more efficient manner due to its high consistency. With the dam 69 thus being substantially lower than the grooves 60 we have increased the life of the refining plates by a substantial amount while yet achieving proper filling of the grooves. This is an important feature of the present invention and is considered a substantial advantage over devices heretofore known in the art. More specifically, our device has been proved to operate satisfactorily with the dams 69 being approximately from .06 inch to .188 inch lower than the top of the adjacent ridge and preferably the dam is .125 inch lower than the top of the ridge.

From the intermediate zone 53 the partially defibrated material travels into a final zone 70. As shown in FIGURE 9 the final zone 70 is defined by the outer annular portion 71 of the upper defibrating disc 41 and the outer annular portion 72 of the lower defibrating disc 43. The opposed surfaces 73 and 74 of the upper and lower discs respectively are provided with a multiplicity of grooves and ridges of a special design which affords final defibration of the fibrous material in such a manner that it is acceptable for mixing with other papermaking stock or dilution so that it may be used in the formation of a paper web. In the final zone the temperature of the fibrous mass is maintained at approximately 140° C. As will be noted from FIGURE 8 the dimensions of the grooves and ridges of the upper defibrating plate in the final zone 71 are substantially equal to the dimensions of the grooves and ridges in the intermediate zone 54. It should, however, be noted that in the final zone the ridges are of substantially constant height or nearly so as are the ridges on the outer annular portion 72 of the lower plate 43. Depending upon the actual consistency of the fibrous material the final defibrating zone may be somewhat tapered towards the outer periphery thereof. Generally speaking, the higher the consistency of the fibrous material the lesser the taper will be. Such a taper may be machined or cast into the upper plate section 41 as well as into the lower plate section 43 or alternatively either one may be tapered while the other remains flat. Dams 81 and 82 are provided in the upper and lower plate sections.

As the material leaves the final defibrating zone it is thrown radially outwardly by means of impellers 83 mounted to the outer periphery of the lower defibrating disc 43. The impellers or blades 83 serve to force the discharged material to the exit port 22 at high velocity.

As further shown in FIGURE 1 the rotating lower disc 18 is mounted to the vertical shaft 23 by means of a straight bore 86 to insure parallelism of the rotating disc 18 with respect to the stationary plate 17. The shaft 23 is held in position by means of a pair of upper and lower bearing assemblies 24 and 25. The bearing assemblies 24 and 25 consist of two pairs of angular contact ball bearings 87 and 88 respectively. The pairs of ball bearings are surrounded by upper and lower housings 89 and 90. The housings 89 and 90 are mounted for axial slidable movement with respect to the upper and lower frame members 91 and 92 and means 93 and 94 in the form of a key or other arrangement has been provided for each bearing assembly to prevent radial displacement thereof but permitting axial displacement.

The lower bearing assembly is provided with a thrust bearing means 95 which receives the lower portion of the drive shaft 23 and carries the downward forces imposed on the rotating shaft by the weight of the rotating elements such as the lower disc 43 and the drive means 11 and also the downward forces exerted on the drive shaft by the defibrating pressures developed in the space 21 between the defibrating surfaces.

For axially displacing the rotor 18 with respect to the stator 17 the lower slidable bearing assembly 25 is connected to a screw jack 96 by means of a shaft 97. The screw jack 96 is driven by means of an electric or other motor means 98. It will thus be seen that the rotor 18 may be controllably raised or lowered thus accurately adjusting the refining space 21 defined by the upper defibrating disc 41 and the lower defibrating disc 43.

We have further provided herein means for manually adjusting the defibrator space 21 which manual adjusting mechanism is particularly useful in setting the initial operating gap at the start of the defibrating process. More specifically this manual adjusting mechanism consists of a gear driven shaft 100 connected to the output shaft 101 of the gear jack 96 by means of a coupling 102. One end of the shaft 100 is mounted in bearing assemblies 103 and a gear wheel 104 is mounted on the shaft 100 between the bearing assemblies. The gear wheel 104 is rotatably driven by means of a chain 106. The chain 106 is driven by a gear wheel 107 which is mounted on a shaft 108 carried by bearing assemblies 109. The shaft 108 has a hand wheel 110 mounted on one end thereof for manual rotation of the shaft 108. It will thus be seen that by rotating the hand wheel 110 the screw jack 96 may be rotated in either direction thus imparting vertical axial movement to the drive shaft 23 which carries the rotor 18.

Figure 13:
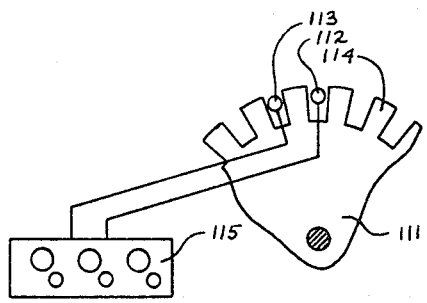
FIGURE 13 is a diagrammatic representation of an improved visual readout mechanism for adjusting the spacing between the refining discs.

We have further provided herein a new and improved visual readout mechanism for accurately determining the disc position and the width of the refining space 21 between the refining plates 41 and 43. This mechanism consists of a toothed wheel 111 mounted to the shaft 100 intermediate the bearing assemblies 103. As shown in FIGURE 13 two proximity switches 112 and 113 are located at two adjacent openings between the gear teeth 114 of the gear wheel 111. The proximity switches 112 and 113 are connected to a visual readout counter 115 thus enabling precise measurement of the travel of one of the teeth 114 of the wheel 115 between the limit switches 112 and 113. By providing two proximity switches we are also able to measure and signal the visual display device 115, which is in the form of a readout counter, to display the direction of rotation of the gear wheel 111 and thereby axial upward or downward displacement of the drive shaft 23. A manually operated lever 116 has been provided to disengage the manual adjusting mechanism when the motor driven adjusting mechanism is engaged. The lever 116 is connected to the clutch 102 for engaging and disengaging the same.

For initial adjustment of the defibrating space 21 the lower disc 43 is manually raised in abutting engagement with the upper defibrating disk 41. The clutch 117 connecting the gear reduction unit 99 to the screw jack 96 is disengaged during the initial adjustment while the clutch 102 is engaged. When zero clearance is obtained the clutch 102 is disengaged and the clutch 117 is engaged for automatic adjustment. With the defibrating space 21 at zero clearance the counter 115 is turned to zero reading. By engaging the motor 98 the gap can be adjusted to an assumed operating gap which may be further controlled during normal operation as a function of power input into or quality of the fibrous material.

For rotationally driving the above described defibrating device we have provided an electric motor 11 mounted intermediate the bearing assemblies 24 and 25. The electric motor consists of a stator 118 and a rotor 119. The rotor 119 is fixedly mounted to the vertical shaft 23 and the rotor is caused to revolve within the stator by an induction current flowing from the stator to the rotor and supplied to the stator from an external source (not shown). The use of an induction type motor has a major advantage in that the driving current need not be supplied to the rotor and therefore awkward and complicated slip ring constructions can be avoided. A further advantage of an induction type motor is that the rotor may be axially shifted with respect to the stator without adversely affecting the output of the motor. The above described induction type motor is suitable for high speed operation and the motor revolves at a speed of from 900 to 3600 revolutions per minute and is preferably 1800 r.p.m. A synchronous type motor may of course be used.

Figure 11:
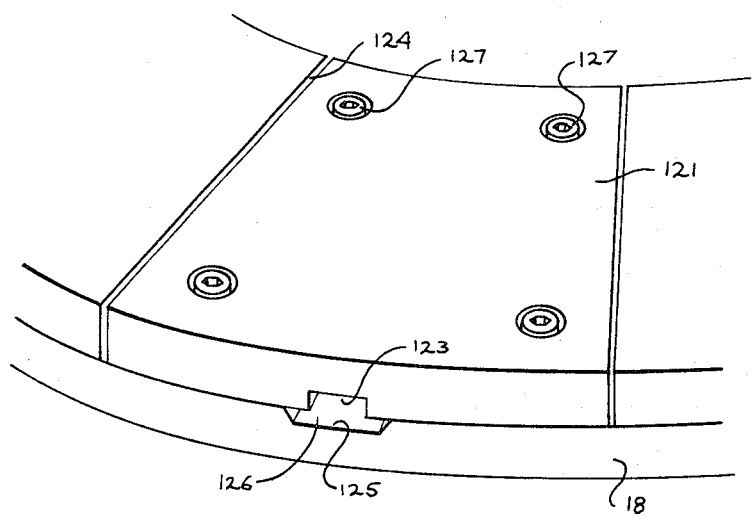
FIGURE 11 is a perspective view showing an improved method of mounting the ring segments to their respective carrying surfaces.
Figure 14:
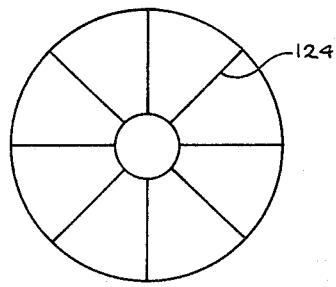
FIGURE 14 is a diagrammatic representation of a refining disc having several disc segments.

A further improvement of our defibrating device is shown in FIGURES 10, 11 and 14. In order to facilitate the fabrication of the circular defibrating discs such discs are manufactured in multiple segments and mounted to premachined mounting surfaces. As shown in FIGURE 1 the upper defibrating disc 17 is mounted to the stationary upper wall of the upper housing 16 and the lower defibrating disc is mounted to the rotor body 18. To facilitate the machining of the defibrating surfaces the rings annd discs are manufactured in sections such as shown in FIGURE 10. The ring section 120 as shown in FIGURE 10 has a multiplicity of pockets 121 therein on the side opposite the defibrating surface of the disc segment. The pockets 121 are provided for the purpose of saving weight and balancing the segments as they are mounted to the rotor. Because of the continuous submergence of the segments in the fibrous suspension the pocket 121 tend to become filled with liquid which may cause the rotor to become out of balance. It has been proposed to fill the pockets 121 with a light substance such as polyurethane foam or other suitable material in order to avoid the entrance of fluid into the pockets. However, such filling material is expensive to apply and is not entirely satisfactory because of the apparent tendency of such materials to absorb water or other fluid. Uneven absorption of water would then cause the rotor to run out of balance. For efficient operation of the defibrating device proper balance of the rotor is essential. In order to resolve this problem of water penetration into the pockets 121 and yet being able to maintain the weight saving features of the pockets we have provided for a multiplicity of channels 122 which interconnect the individual pockets 121 with each other and thus permitting fluid to flow outwardly from the pockets into the adjacent pocket and from there to a common liquid outlet 123 in the outer periphery of the disc segment. It will thus be seen that any liquid which may enter into the pockets 121 of the disc segments through the joints 124 between the individual disc segments as shown in FIGURES 11 and 14 is permitted to flow freely outwardly from said pockets towards the outer periphery of the disc segment 120. As shown in FIGURE 11 we have provided a further channel 125 opposite the channel 123. The channel 125 is machined into the rotor element 18. The channel 125 together with the channel 123 provide for an easy opening 126 in which a screwdriver or other appropriate means may be inserted to remove the disc segment 121 from the rotor element 18 after the mounting bolts 127 have been removed. As will be appreciated the fibrous material being processed by this defibrating device has certain adhesive characteristics which may cause the segment 121 to firmly adhere to the rotor 18. By inserting a screwdriver into the opening 126 such adhesive forces may be easily overcome thus facilitating the removal of the segment 121 from the rotor 18.

From the above description of our invention it will be seen that we have provided an improved defibrating device not heretofore known in the art and which contains numerous features and advantages operational as well as economic in nature. The defibrating device of our invention is capable of running and is particularly designed for running at high consistencies thus requiring less B.t.u.'s to heat up the fibrous material because of the smaller amount of water or other dilution agent present in 52 surrounding the fibrous material. The operating temperature of the fibrous material can be in the range of 80° C. to 180° C. but should preferably be from 100° C. to 140° C. In the above described defibrating device the fibrous material is permitted to flow uniformly into the defibrating zone thus avoiding plugging of the defibrating zone and eliminating back pressures caused by the generation of steam. The high consistency of the material in the defibrating zone allows the discs to run with a relatively large clearance between them, which reduces mechanical damage to the fibers and increases disc life by eliminating metal to metal contact of the defibrating surfaces. The gap between the discs may vary from .001 inch to .050 inch. The gap between the defibrating surfaces reduces towards the outer periphery of the defibrating zone which permits a gradual breakdown of the fibrous material under controlled temperature and pressure conditions.

The defibrating device of our invention is capable of producing high quality paper making stock in a single or multiple pass operation. Defibrating devices known in the art to date are not suitable for single pass operation because of their inability to handle the material at high enough consistencies to concentrate the power required to separate the fibers into a fibrous material. Such prior art devices are further unable to dispose of the amount of steam formed under single pass high consistency operating conditions.

In addition to a continuous vent to ambient atmosphere to dispose of the steam formed in the initial part of the defibrating zone we have provided an improved initial defibrating zone in which the unit groove area is large compared with the unit groove area of the final defibrating zone thus providing rapid and controlled temperature rise in the initial defibrating zone. To further control the temperature and to regulate the consistency of the fibrous material we have provided for a fluid supply line which may be used in the dual capacity of temperature and consistency control.

Our defibrating surfaces have been substantially improved and their operating life has been greatly increased by decreasing the dams in the grooves between the ridges from approximately $\frac{1}{16}$ inch below the top of the ridge to at least $\frac{3}{16}$ inch below the top of the ridge. This decrease in dam height is feasible because of the high consistencies at which our device is intended to operate. At higher consistencies the fibrous material tends to adhere to the groove walls quicker which results in proper and efficient filling of such grooves with fibrous material. At very high consistencies our device has shown to be capable of running satisfactorily without dams in the grooves.

A further improvement in our invention is the provision of positive control of disc position of which presently known devices are not capable because in such devices the rotating discs are mounted in a vertical plane and are overhung or mounted on a horizontal shaft. Because of the high pressures and temperatures required in the defibrating zone between the discs, the discs must be of heavy construction which makes it extremely difficult to maintain parallelism of such discs when they are mounted in a vertical plane as above described. In addition, vertical discs must be adjusted in a horizontal direction and during such adjustment one must overcome the frictional forces of the bearing assemblies which hold the discs together. Furthermore, in a horizontal shaft design the accumulated clearances of the bearings are lateral and the rotor is always floating. Expensive additional equipment is needed to compensate for these accumulated clearances. In our design, the discs are simply held apart by gravity.

Although the above described defibrating device has been generally referred to as operating on fibrous material, such material is deemed to include wood chips, wood shavings and sawdust, which are ligno-cellulosic materials. The device may be further used to defibrate non-ligno-celulosic materials such as sugar cane, straw, prairie grass, waste paper and rags.

It should further be noted that the device of the present invention is also capable of operating on defibrated fibrous materials having consistencies of up to 90% or more so as to further refine and improve the same. For example, we have found that chemical fibers produced by sulfate, sulfite, chemi-mechanical processes can be refined with the above described device at high consistencies, in the range of 40%, thereby increasing bonding and stretch characteristics while retaining maximum fiber length.

Although we have described our invention with some particularity, it is obvious that the invention is not restricted thereto, but is broad enough to cover all structures coming within the scope of the annexed claims.

We claim as our invention:
1. A mechanical pulping and defibrating device comprising in combination,
   a feed chute vented to ambient atmosphere,
   a fluid supply line partially extending into said chute,
   a generally cylindrical housing immediately below said chute and in open communication therewith,
   means defining an exit port in said housing,
   means in said housing containing a generally horizontally arranged upper defibrating disc and a generally horizontally arranged lower defibrating disc spaced from said upper disc, said upper disc being fixedly mounted to an upper wall of the housing and having a downwardly facing defibrating surface, said lower disc being mounted for rotation about a vertical axis and having an upwardly facing defibrating surface, circumferentially spaced material distributing impeller means mounted on said lower disc and forming therewith a central distributing zone located generally vertically below said chute, means defining a material prebreaking zone defined by a downwardly facing inner annular portion of said upper disc and an upwardly facing inner annular portion of said lower disc, said prebreaking zone having a plurality of opposed radially extending angularly spaced bars mounted on said upper and lower disc respectively and defining material receiving grooves, said grooves decreasing in cross-sectional area in a plane containing said vertical axis toward the outer periphery of said discs, means defining an intermediate material defibrating zone defined by intermediate annular portions of said upper and lower discs, said intermediate zone having a plurality of opposed radially extending angularly spaced parallel bars on said upper and lower disc respectively and defining converging material receiving grooves, the bars on said upper disc being of substantially smaller cross-sectional area and being spaced closer together than the bars on the lower disc, means defining a final material defibrating zone defined by close running opposed outer annular portions of said upper and lower disc respectively, said final zone having a plurality of opposed radially extending angularly spaced parallel bars on said upper and lower disc respectively and defining material receiving grooves of substantially constant cross-sectional area, the bars on said upper and lower discs being of substantially equal cross-sectional area and being spaced apart substantially equally, blade means mounted on the outer periphery of the lower disc for rotation therewith and for forcing processed material issuing from said final zone towards the exit portion of the housing, a vertical longitudinally extending shaft fixedly connected to said lower disc, said shaft being mounted for rotation by an upper and lower bearing assembly, drive means connected to said shaft and mounted intermediate said upper and lower bearing assemblies, said drive means comprising an induction type motor having a rotor and a stator, said rotor being securely attached to said shaft, said stator mounted to a generally cylindrical vertically extending casing, said bearing assemblies being axially slidably mounted in said casing and having means for preventing angular displacement thereof, said lower bearing assembly including a thrust bearing means for receiving the lower portion of said shaft, adjusting means operatively connected to said lower bearing assembly for controllably raising and lowering said shaft assembly whereby the spacing between said upper and lower discs may be controllably varied, said adjusting means comprising a screw jack assembly operatively connected to a drive motor by means of a gear reduction unit.

2. In a defibrating device, a first generally cylindrical housing, first and second means within said housing defining defibrating surfaces mounted for close running relative movement, said first housing having an upper wall portion including means defining a material receiving inlet and a pressure relieving vent, a second housing mounted to the upper wall of said first housing and being in open communication therewith, said second housing having an upper wall portion, means defining an exit port in said second housing, a trough like member extending through the upper wall portions of said first and second housings, whereby fibrous material may be fed to said defibrating surfaces in a generally downward direction and whereby gaseous pressures generated by defibration of fibrous material may be relieved to ambient atmosphere through said exit port in a generally upward direction without interfering with the generally downward stream of fibrous material.

3. In a defibrating device, a first generally cylindrical housing, first and second means within said housing defining defibrating surfaces mounted for close running relative movement, said first housing having an upper wall portion including means defining a chip receiving inlet and a pressure relieving vent, a second housing mounted to the upper wall of said first housing and being in open communication therewith, said second housing having an upper wall portion, means defining an exit port in said second housing, a trough like member extending through the upper wall portions of said first and second housings, whereby fibrous material may be fed to said defibrating surfaces in a generally downward direction and whereby gaseous pressures generated by defibration of fibrous material may be relieved to ambient atmosphere through said exit port in a generally upward direction without interfering with the generally downward stream of fibrous material, and a fluid supply line extending into said trough like member.

4. In a defibrating device, a first generally cylindrical housing, first and second means within said housing defining defibrating surfaces mounted for close running relative movement, said first housing having an upper wall portion including means defining a chip receiving inlet and a pressure relieving vent, a second housing mounted to the upper wall of said first housing and being in open communication therewith, said second housing having an upper wall portion, means defining an exit in said second housing, an exhaust fan above said exit port, a trough like member extending through the upper wall portions of said first and second housings, whereby fibrous material may be fed to said defibrating surfaces in a generally downward direction and whereby gaseous pressures generated by defibration of fibrous material may be relieved to ambient atmosphere through said exit port in a generally upward direction without interfering with the generally downward stream of fibrous material.

5. In a defibrating device, a generally cylindrical housing, means within said housing defining defibrating surfaces mounted for close running relative movement, one of said means comprising a rotor having a plurality of defibrating segments mounted thereto, each of said defibrating segments having means defining a plurality of cavities in a surface thereof facing said rotor, first means in said segments defining a first plurality of channels interconnecting said cavities and second means defining a channel connecting at least one of said cavities to an outer peripheral portion of said rotor whereby liquid may be thrown radially outwardly from said cavities and from said rotor to maintain balance of said rotor.

6. In a defibrating device, a generally cylindrical housing, means within said housing defining defibrating surfaces mounted for close running relative movement, one of said means comprising a rotor having a plurality of defibrating segments mounted thereto, each of said defibrating segments having means defining a plurality of cavities in a surface thereof facing said rotor, first means in said segments defining a first plurality of channels interconnecting said cavities, second means in said segments defining a second channel connecting at least one of said cavities to an outer peripheral portion of said rotor, and means in said rotor defining a third channel generally opposite said second channel whereby liquid may be thrown radially outwardly from said cavities and from said rotor and whereby means may be inserted in said second and third channels to facilitate removal of said segments from said rotor.

References Cited

UNITED STATES PATENTS

| | | | |
|---|---|---|---|
| 108,103 | 10/1870 | Buchholz | 241—259 X |
| 2,823,871 | 2/1958 | Larsson | 241—259 X |
| 2,937,815 | 5/1960 | Eirich et al. | 241—260 X |
| 2,959,362 | 11/1960 | Smith et el. | 241—17 X |
| 3,040,997 | 6/1962 | Borden | 241—260 X |
| 3,089,655 | 5/1963 | Heinz et al. | 241—260 |
| 3,104,837 | 9/1963 | Steiniger et al. | 244—260 X |
| 3,149,792 | 9/1964 | Textor | 241—260 |
| 2,955,768 | 10/1960 | Engi | 241—259 X |
| 3,116,028 | 12/1963 | Bidwell | 241—257 X |
| 2,609,993 | 9/1952 | Planiol | 241—58 X |
| 2,968,444 | 1/1961 | Jones | 241—260 X |

ANDREW R. JUHASZ, *Primary Examiner.*